(No Model.)
H. MARION.
MESSAGE HOLDER FOR USE WITH HOMING PIGEONS.
No. 569,111. Patented Oct. 6, 1896.
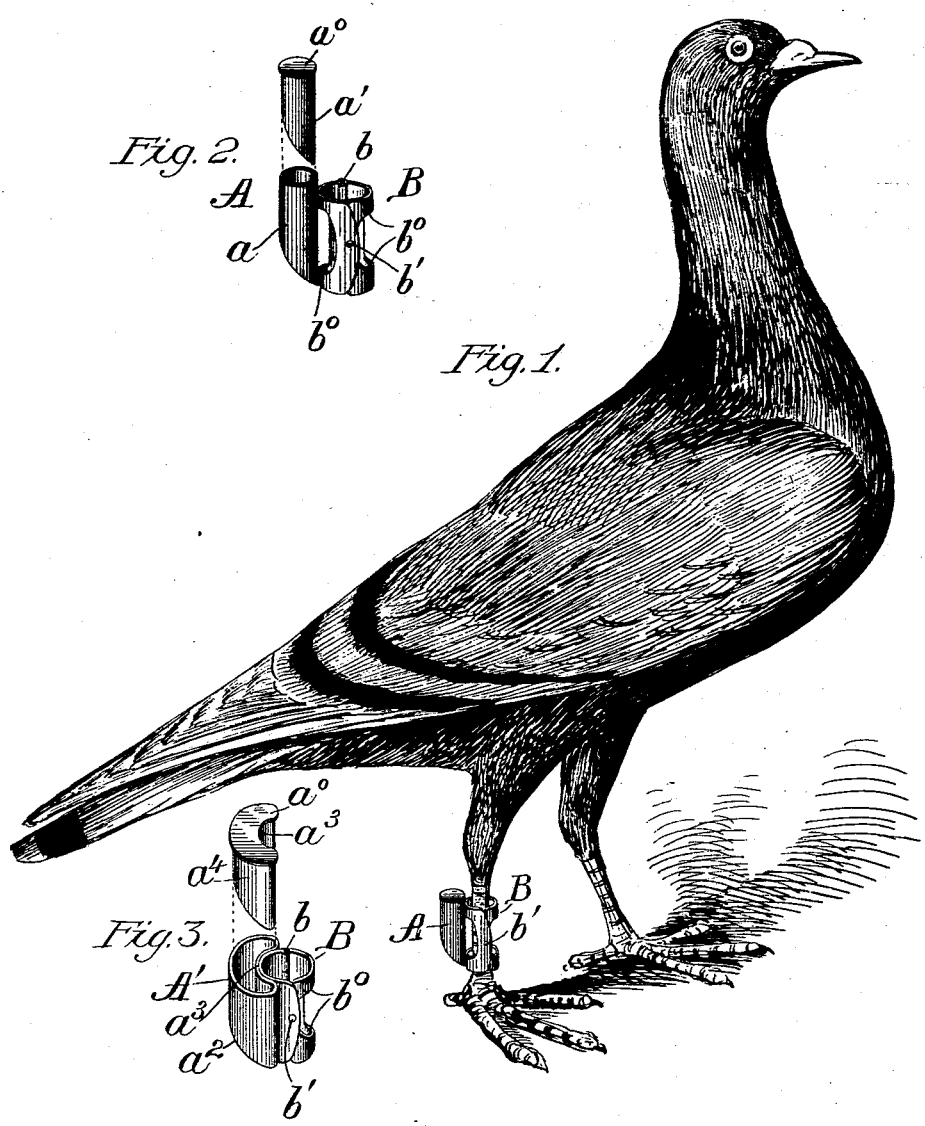

UNITED STATES PATENT OFFICE.

HENRI MARION, OF ANNAPOLIS, MARYLAND.

MESSAGE-HOLDER FOR USE WITH HOMING PIGEONS.

SPECIFICATION forming part of Letters Patent No. 569,111, dated October 6, 1896.

Application filed June 6, 1896. Serial No. 594,595. (No model.)

*To all whom it may concern:*

Be it known that I, HENRI MARION, a citizen of the United States, residing at Annapolis, in the county of Anne Arundel and State of Maryland, have invented certain new and useful Improvements in Message-Holders for Use with Homing Pigeons; and I do hereby declare the following to be a full, clear, and exact description of the invention, such as will enable others skilled in the art to which it appertains to make and use the same.

My invention relates to improvements in message-holders to be used in connection with homing or carrier pigeons.

It has hitherto been the custom to place the messages in quills and to tie these quills to one of the tail-feathers of the bird, but the quills containing the messages are often lost, thus rendering this method of transmitting messages at times unreliable.

According to my invention I attach the message-holder to the leg of the pigeon in such a way that the bird is unable to detach the same either by pecking at it or accidentally.

My invention will be understood by reference to the accompanying drawings, in which the same parts are indicated by the same letters through the several views.

Figure 1 represents the profile of a carrier-pigeon having one of my improved message-holders attached to one of the legs thereof. Fig. 2 represents in perspective the message-holder shown in Fig. 1 as detached from the leg of the pigeon and the box for holding the message being removed, and Fig. 3 represents a modified form of the message-holder in which the holder proper is curved to fit the leg of the bird.

The apparatus consists of a clasp or fastening and a box or case attached thereto, the clasp or fastening being of any suitable make that may be attached to the leg of the bird without causing injury thereto, while the box or case for holding the message may be of any preferred form of construction attached to the said clasp.

In Figs. 1 and 2 I have shown a box A, provided with a case $a$, and a box $a'$, fitting in said case and having a beaded top $a^0$. This case $a$ is secured to the clasp B, which is hinged, as at $b$, and is caught, as at $b'$, by any suitable catch.

In order to obtain greater lightness, the two parts of the clasp B may be hollowed out, as shown at $b^0$.

The box $a'$ should fit snugly in the case $a$, so as to be held firmly therein during the flight of the bird, and also should be approximately or wholly water-tight to protect the despatches from moisture.

In the form of device shown in Fig. 3 the clasp B is similar to that shown in Figs. 1 and 2; but the case $a^2$ and the box proper, $a^4$, are both curved, as at $a^3$, to fit the clasp B, which corresponds in general shape to the leg of the bird. Thus with the device shown in Fig. 3 a more compact structure is shown.

It will be obvious that one of the message-holders may be used on each leg of the bird, either to carry additional despatches or to better balance the bird in its flight.

I do not wish to limit myself to any particular form of clasp, spring, band, or anklet or to any particular form of despatch-holder. These may be arranged in a great variety of ways. Nor do I mean to limit myself to any particular material. The parts may be made of aluminium, zinc, brass, steel, silver, or celluloid, while the box may be of rubber, quill, or like material.

Having thus described my invention, what I claim, and desire to secure by Letters Patent of the United States, is—

1. A message-holder for use with homing pigeons, comprising a spring clasp or band adapted to be detachably connected to the leg of the pigeon, and a box or case for the message connected to said spring clasp or band, substantially as described.

2. In a message-holder for use with homing pigeons, the combination with the spring-clasp adapted to be detachably connected to the leg of the pigeon, and a box or case for the despatch rigidly attached to said clasp and removable therewith, substantially as described.

3. In a message-holder for use with homing pigeons, the combination with a hinged spring-clasp adapted to be detachably connected to the leg of the bird, with a box or case attached to said clasp and adapted to hold the despatch, substantially as described.

4. In a message-holder for use with homing pigeons, the combination with a hinged clasp adapted to be detachably connected to the leg of the bird, of a case rigidly attached to said clasp, and a box for the message adapted to slide in said case and to be normally held therein, substantially as described.

In testimony whereof I affix my signature in presence of two witnesses.

HENRI MARION.

Witnesses:
FRANK B. MAYER,
J. R. WILMER.